(12) United States Patent
Conley et al.

(10) Patent No.: US 8,765,255 B2
(45) Date of Patent: Jul. 1, 2014

(54) BREATHABLE WATERPROOF GARMENT

(75) Inventors: Jill A. Conley, Midlothian, VA (US); Robert Anthony Marin, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 1487 days.

(21) Appl. No.: 12/074,166

(22) Filed: Feb. 29, 2008

(65) Prior Publication Data

US 2008/0216205 A1    Sep. 11, 2008

Related U.S. Application Data

(60) Provisional application No. 60/905,284, filed on Mar. 6, 2007.

(51) Int. Cl.
*B32B 3/26* (2006.01)

(52) U.S. Cl.
USPC ............. 428/315.5; 428/304.4; 977/762; 2/82; 2/87

(58) Field of Classification Search
USPC ......... 428/315.5, 304.4; 2/82, 87; 442/85, 90, 442/86; 977/762
See application file for complete search history.

(56) References Cited

U.S. PATENT DOCUMENTS

| | | | |
|---|---|---|---|
| 494,284 A | 3/1893 | Sweet | |
| 523,644 A | 7/1894 | Rhoades | |
| 3,329,557 A | 7/1967 | Magat et al. | |
| 3,374,288 A | 3/1968 | DuPont | |
| 3,953,566 A | 4/1976 | Gore | |
| 3,966,835 A | 6/1976 | Christoph et al. | |
| 4,104,394 A | 8/1978 | Okita | |
| 4,110,239 A | 8/1978 | Prince | |
| 4,127,706 A | 11/1978 | Martin et al. | |
| 4,187,390 A | 2/1980 | Gore | |
| 4,350,655 A | 9/1982 | Hoge | |
| 4,472,328 A | 9/1984 | Sugimoto et al. | |
| 4,596,837 A | 6/1986 | Yammamoto et al. | |
| 4,777,073 A | 10/1988 | Sheth | |
| 4,933,060 A | 6/1990 | Prohaska et al. | |
| 5,047,287 A | 9/1991 | Horiuchi et al. | |
| 5,098,625 A | 3/1992 | Huang et al. | |
| 5,167,890 A | 12/1992 | Sasshofer et al. | |
| 5,170,011 A | 12/1992 | Martucci | |
| 5,217,666 A | 6/1993 | Tamaru et al. | |
| 5,225,131 A | 7/1993 | Tamaru et al. | |
| 5,234,739 A | 8/1993 | Tamaru et al. | |
| 5,234,751 A | 8/1993 | Harada et al. | |
| 5,364,582 A | 11/1994 | Lilly | |
| 5,855,977 A | 1/1999 | Fukushi et al. | |
| 6,046,119 A * | 4/2000 | Kaibe et al. | 442/76 |
| 6,869,682 B2 | 3/2005 | Jing | |
| 6,962,754 B2 | 11/2005 | Bussi et al. | |
| 2004/0116028 A1 * | 6/2004 | Bryner | 442/381 |
| 2005/0266228 A1 * | 12/2005 | Jain et al. | 428/316.6 |

FOREIGN PATENT DOCUMENTS

| | | |
|---|---|---|
| AU | 564564 B | 8/1987 |
| DE | 19733591 | 10/1998 |
| EP | 0185590 | 12/1985 |
| EP | 0523644 B1 | 7/1992 |
| EP | 0551 094 B1 | 5/1993 |
| GB | 990713 A | 4/1963 |
| GB | 990713 | 4/1965 |
| JP | 1078823 | 3/1989 |
| JP | 3221541 | 9/1991 |
| WO | WO01/26495 | 4/2001 |
| WO | WO 03/080905 A1 | 10/2003 |
| WO | WO2007/025099 | 3/2007 |
| WO | WO2008/057419 | 5/2008 |

OTHER PUBLICATIONS

PCT International Search Report and Written Opinion for International Application No. PCT/US2008/002953 Dated Mar. 6, 2008.
U.S. Appl. No. 11/523,827, filed Sep. 20, 2006, DuPont.

* cited by examiner

*Primary Examiner* — Matthew Matzek

(57) ABSTRACT

A garment containing a breathable laminate that is optionally bonded to an outer layer fabric and an optional inner layer fabric. The breathable laminate is constructed from a microporous membrane situated in a face to face relationship with a nanoweb and optionally bonded thereto.

20 Claims, No Drawings

BREATHABLE WATERPROOF GARMENT

FIELD OF THE INVENTION

The present invention relates to garments that contain breathable and waterproof layers and to the construction of the layers.

BACKGROUND

It is well known to incorporate breathable and waterproof membranes into a garment in order to impart breathability to the garment while making it waterproof and therefore more comfortable to the user. For example expanded polytetrafluoroethylene membranes (ePTFE) have been used for this application.

Over time, soil impingement in the form of body oils and exudates can severely affect membrane performance by blocking the pores in the membrane. Attempts to protect the membrane by coating it with polymers that allow passage of moisture vapor cause a reduction of the breathability of the garment. There is therefore a tradeoff between lifetime and comfort.

The materials of this invention are designed to solve these problems ad provide a soil resistant, highly breathable structure.

SUMMARY OF THE INVENTION

In one embodiment the present invention is directed to a garment having an outer side and an inner side comprising a breathable laminate and an outer layer fabric, said breathable laminate comprising a microporous membrane situated in a face to face relationship with a nanoweb.

DETAILED DESCRIPTION

The term "outer" when used to describe the location of a layer refers to the face of the garment that faces away form the wearer. The term "inner" refers to the user facing side of the garment.

The terms "nanofiber layer" and "nanoweb" are used interchangeably herein. A nanoweb is a nonowoven that comprise nanofibers.

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

By "garment" is meant any item that is worn by the user to protect some region of the user's body from weather or other factors in the environment outside the body. For example coats, jackets, pants, hats, gloves, shoes, socks, and shirts would all be considered garments under this definition.

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials.

"Calendering" is the process of passing a web through a nip between two rolls. The rolls may be in contact with each other, or there may be a fixed or variable gap between the roll surfaces. An "unpatterned" roll is one which has a smooth surface within the capability of the process used to manufacture them. There are no points or patterns to deliberately produce a pattern on the web as it passed through the nip, unlike a point bonding roll.

The garment of the present invention comprises a composite web, made from a nanofiber web of one or more nanofiber layers in combination with a microporous membrane. This combination can be made by adhesively laminating the nanofiber web to the membrane, or by forming the nanofiber layer directly on the membrane during the nanoweb spinning process to form a membrane/nanofiber layer structure. The nanofiber layer can also be adhered to the membrane by mechanical entanglement. Examples of the membrane may include various microporous films such as stretched, filled polymers and expanded polytetrafluoroethylene (ePTFE) and can be used without limitation so long as a nanofiber layer can be added on the substrate.

The as-spun nanoweb comprises primarily or exclusively nanofibers, advantageously produced by electrospinning, such as classical electrospinning or electroblowing, and in certain circumstances, by melt blowing, or other such suitable processes. Classical electrospinning is a technique illustrated in U.S. Pat. No. 4,127,706, incorporated herein in its entirety, wherein a high voltage is applied to a polymer in solution to create nanofibers and nonwoven mats. However, total throughput in electrospinning processes is too low to be commercially viable in forming heavier basis weight webs.

The "electroblowing" process is disclosed in World Patent Publication No. WO 03/080905, incorporated herein by reference in its entirety. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

A substrate or scrim can be arranged on the collector to collect and combine the nanofiber web spun on the substrate. Examples of the substrate may include various nonwoven cloths, such as melt blown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof.

Polymer materials that can be used in forming the nanowebs of the invention are not particularly limited and include both addition polymer and condensation polymer materials such as, polyacetal, polyamide, polyester, polyolefins, cellulose ether and ester, polyalkylene sulfide, polyarylene oxide, polysulfone, modified polysulfone polymers, and mixtures thereof. Preferred materials that fall within these generic classes include, poly (vinylchloride), polymethylmethacrylate (and other acrylic resins), polystyrene, and copolymers thereof (including ABA type block copolymers), poly (vinylidene fluoride), poly (vinylidene chloride), polyvinylalcohol in various degrees of hydrolysis (87% to 99.5%) in crosslinked and non-crosslinked forms. Preferred addition polymers tend to be glassy (a $T_g$ greater than room temperature). This is the case for polyvinylchloride and polymethylmethacrylate, polystyrene polymer compositions or alloys or low in crystallinity for polyvinylidene fluoride and polyvinylalcohol materials. One preferred class of polyamide condensation polymers are nylon materials, such as nylon-6, nylon-6,6, nylon 6,6-6,10, and the like. When the polymer nanowebs of the invention are formed by melt blowing, any thermoplastic polymer capable of being melt blown into nanofibers can be used, including polyolefins, such as polyethylene, polypropylene and polybutylene, polyesters such as poly(ethylene terephthalate) and polyamides, such as the nylon polymers listed above.

It can be advantageous to add known-in-the-art plasticizers to the various polymers described above, in order to reduce the $T_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer $T_g$ include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The *Handbook of Plasticizers*, edited by George Wypych, 2004 Chemtec Publishing, incorporated herein by reference, discloses other polymer/plasticizer combinations which can be used in the present invention.

The as-spun nanoweb of the present invention can be calendered in order to impart the desired physical properties to the fabric of the invention, as disclosed in co-pending U.S. patent application Ser. No. 11/523,827, filed Sep. 20, 2006 and incorporated herein by reference in its entirety. The as-spun nanoweb can be fed into the nip between two unpatterned rolls in which one roll is an unpatterned soft roll and one roll is an unpatterned hard roll, and the temperature of the hard roll is maintained at a temperature that is between the $T_g$, herein defined as the temperature at which the polymer undergoes a transition from glassy to rubbery state, and the $T_{om}$, herein defined as the temperature of the onset of melting of the polymer, such that the nanofibers of the nanoweb are at a plasticized state when passing through the calendar nip. The composition and hardness of the rolls can be varied to yield the desired end use properties of the fabric. One roll can be a hard metal, such as stainless steel, and the other a soft-metal or polymer-coated roll or a composite roll having a hardness less than Rockwell B 70. The residence time of the web in the nip between the two rolls is controlled by the line speed of the web, preferably between about 1 m/min and about 50 m/min, and the footprint between the two rolls is the MD distance that the web travels in contact with both rolls simultaneously. The footprint is controlled by the pressure exerted at the nip between the two rolls and is measured generally in force per linear CD dimension of roll, and is preferably between about 1 mm and about 30 mm.

Further, the nonwoven web can be stretched, optionally while being heated to a temperature that is between the $T_g$ and the lowest $T_{om}$ of the nanofiber polymer. The stretching can take place either before and/or after the web is fed to the calender rolls and in either or both the machine direction or cross direction.

The nanoweb can further comprise an antistatic agent. For example it is known that anti-static polyamide-based shaped articles such as fibers or filaments can be obtained by adding as an agent a poly-(alkylene ether)-glycol either to the condensation mixture or to the molten polyamide (cf. for example, U.S. Pat. Nos. 3,329,557, 3,374,288, and 3,966, 835; German Pat. No. 1,286,683 issued Jan. 9, 1969, Belgian Pat. No. 631,199, Swiss Pat. No. 456,029) all incorporated herein by reference in their entirety. Conventional antistatic products are fabricated by adding as antistatic agent conductive fillers like carbon black, conductive metal fiber, metal powder, or china powder to enhance their effective antistatic properties. The products described above have the advantages of being low-cost and having high-conductivity and are also suitable for use in the present invention.

Another method for manufacturing a modified antistatic high molecular weight fiber and woven is disclosed in U.S. Pat. No. 5,364,582, wherein 0.8 to about 2.5% by weight of low molecular weight amino-olefin is added as an antistatic agent to enhance the antistatic property, ultraviolet light resistance, dyeing ability and uptake properties of dyes. One skilled in the art will recognize further antistatic agents that can be used in the present invention.

The nanoweb can be further treated with a compound to render the surface thereof oleophobic or hydrophobic. One skilled in the art will know of appropriate compounds. Examples of such treatments are Zonyl fluorinated surfactant (DuPont, Wilmington, Del.) as described in commonly assigned U.S. patent application Ser. No. 11/592,644 (filed 3 Nov. 2006) hereby incorporated in its entirety by reference.

The nanoweb is adjacent to a microporous membrane and optionally bonded thereto. The membrane can be an expanded PTFE (ePTFE), or any other kind of microporous membrane known to one skilled in the art. The ePTFE can be sintered or unsintered in the membrane used in the invention.

An ePTFE membrane can be prepared by a number of different known processes, but is preferably prepared by expanding polytetrafluoroethylene as described in U.S. Pat. Nos. 4,187,390; 4,110,239; and 3,953,566 to obtain ePTFE, all of which are incorporated herein by reference. By "porous" is meant that the membrane has an air permeability of at least 0.05 cubic meters per minute per square meter (m/min) at 20 mm water gauge. Membranes with air permeabilities of 200 m/min at 20 mm water or more can be used. The pores are micropores formed between the nodes and fibrils of the ePTFE.

Similarly a membrane can be used that is described in any of U.S. Pat. Nos. 5,234,751, 5,217,666, 5,098,625, 5,225, 131, 5,167,890, 4,104,394, 5,234,739, 4,596,837, JPA 1078823 and JPA 3-221541 in which extruded or shaped PTFE which is unexpanded is heated to sinter or semi-sinter the article. This sintered or semi-sintered article is then stretched to form a desired porosity and desired properties.

For special applications, PTFE can be provided with a filler material in order to modify the properties of PTFE for special applications. For example, it is known from U.S. Pat. No. 4,949,284 that a ceramic filler ($SiO_2$) and a limited amount of microglass fibers can be incorporated in a PTFE material; and in EP-B-0-463106, titanium dioxide, glass fibers, carbon black, activated carbon and the like are mentioned as filler.

Techniques for the preparation of microporous films from highly filled polymers, usually polyolefins, are known. Such webs are also suitable for use as the membrane of the invention. Typically a combination of a polyolefin, usually a polyethylene, is compounded with a filler, usually $CaCO_3$, and extruded and stretched into a film with to form a microporous film.

Suitable examples of microporous films for use as the filtration membrane of the present invention include those described in U.S. Pat. Nos. 4,472,328, 4,350,655 and 4,777,073 all of which are incorporated herein by reference.

The microporous membrane and nanoweb can be optionally bonded to each other, such as by solvent bonding, adhesive bonding, thermal bonding, and ultrasonic bonding, although any means for bonding known to one skilled in the art may be employed. In a preferred embodiment, the membrane is bonded to the nanoweb, for example, using a suitable lamination technique, such as passing the materials through a hot roll nip at a temperature sufficient to melt adhesive that has been applied to the membrane or nanoweb. One of the rolls can have a raised pattern on its surface in order to produce a bonding pattern in the laminate.

Different methods of coating the nanoweb or membrane with adhesive before lamination can be used. For example the nanoweb can be first coated in the required areas with adhesive and then the ePTFE membrane is placed onto the adhesive side of the coated fabric. Conductive heat and ample pressure are applied to the membrane side to cause the adhesive to flow into the membrane pores. If the adhesive is cross-linkable, the adhesive cross-links due to the heat and results in a mechanical attachment of the membrane to the substrate.

As a further example of an article formed from a laminate of a fluoropolymer and a non-fluorinated polymer and a process of lamination, U.S. Pat. No. 5,855,977 discloses a multilayer article comprising a substantially non-fluorinated layer and a fluorinated layer of fluoropolymer comprising interpolymerized monomeric units. The multi-layer article further comprises an aliphatic di- or polyamine, the aliphatic di- or polyamine providing increased adhesion between the layers as compared to a multi-layer article not containing the aliphatic di- or polyamine.

A variety of further methods can be used to increase the adhesion between a fluorinated polymer layer and a polyamide. An adhesive layer can, for example, be added between the two polymer layers. U.S. Pat. No. 5,047,287 discloses a diaphragm, suitable for use in automotive applications that comprises a base fabric having a fluororubber layer bonded to at least one surface by an adhesive that includes an acrylonitrile-butadiene or acrylonitrile-isoprene rubber having an amino group.

Surface treatment of one or both of the layers also sometimes is employed to aid bonding. Some, for example, have taught treating fluoropolymer layers with charged gaseous atmosphere (e.g., corona treatment) and subsequently applying a layer of a second material, for example a thermoplastic polyamide. E.g., European Patent Applications 0185590 (Ueno et al.) and 0551094 (Krause et al.) and U.S. Pat. Nos. 4,933,060 (Prohaska et al.) and 5,170,011 (Martucci).

Blends of the fluoropolymer and the dissimilar layer themselves are in some cases employed as an intermediate layer to help bond the two layers together. European Patent Application 0523644 (Kawashima et al.) discloses a plastic laminate having a polyamide resin surface layer and a fluororesin surface layer.

In a further example of a method of bonding a non-fluoropolymer layer to a fluoropolymer layer, U.S. Pat. No. 6,869,682 describes an article comprising a first layer of fluoropolymer bonded to a second layer of a mixture of melt processable substantially non-fluorinated polymer, a base, and a crown ether.

In a still further example of a method of bonding a non-fluoropolymer layer to a fluoropolymer layer U.S. Pat. No. 6,962,754 describes a structure comprising a fluoropolymer layer and directly attached to one of its sides a tie layer comprising a tie resin of a polyamide which results from the condensation of monomers comprising essentially at least one di-acid and at least one diamine of a specific composition.

The heat and pressure of the method by which the layers are brought together (e.g., coextrusion or lamination) may be sufficient to provide adequate adhesion between the layers. However, it may be desirable to further treat the resulting multi-layer article, for example with additional heat, pressure, or both, to provide further adhesive bond strength between the layers. One way of supplying additional heat when the multi-layer article prepared by extrusion is by delaying the cooling of the laminate after co-extrusion. Alternatively, additional heat energy may be added to the multi-layer article by laminating or coextruding the layers at a temperature higher than necessary for merely processing the several components. As another alternative, the finished laminate may be held at an elevated temperature for an extended period of time. For example the finished multi-layer article may be placed in a separate means for elevating the temperature of the article, such as an oven or heated liquid bath. A combination of these methods may also be used.

The laminate of nanoweb and membrane is located in the garment adjacent to an outer fabric layer and an optional inner fabric layer. A wide variety of natural and synthetic fabrics are known and may be used as the fabric layer or layers in the present invention, for example, for constructing sportswear, rugged outerwear and outdoor gear, protective clothing, etc. (for example, gloves, aprons, chaps, pants, boots, gators, shirts, jackets, coats, socks, shoes, undergarments, vests, waders, hats, gauntlets, sleeping bags, tents, etc.). Typically, vestments designed for use as rugged outerwear have been constructed of relatively loosely-woven fabrics made from natural and/or synthetic fibers having a relatively low strength or tenacity (for example, nylon, cotton, polyesters, polyacrylics, polypropylene, etc.), with each fiber having a tensile strength or tenacity of less than about 8 grams g/Denier (gpd), more typically less than about 5 gpd, and in some cases below about 3 gpd. Such materials can have a variety of beneficial properties, for example, dyeability, breathability, lightness, comfort, and in some instances, abrasion-resistance.

Different weaving structures and different weaving densities may be used to provide several alternative woven composite fabrics as a component of the invention. Weaving structures such as plain woven structures, reinforced plain woven structures (with double or multiple warps and/or wefts), twill woven structures, reinforced twill woven structures (with double or multiple warps and/or wefts), satin woven structures, reinforced satin woven structures (with double or multiple warps and/or wefts) may be used. Stretch woven fabrics, ripstops, dobby weaves, and jacquard weaves are also suitable for use in the present invention.

The nanoweb/membrane laminate may be bonded to the fabric layers over some fraction of its surface and can be bonded to the fabric layer by any means known to one skilled in the art, for example adhesively, thermally, using an ultrasonic field, stitching or by solvent bonding.

One or more adhesives may optionally be used to bond the nanoweb and microporous membrane or the laminate to the inner or outer fabrics. One suitable adhesive is a thermoplastic adhesive, which can be softened upon heating, then hardened upon cooling over a number of heating and cooling cycles. An example of such a thermoplastic adhesive would be a "hot melt" adhesive. In one embodiment the nanoweb is bonded adhesively using a solution of a polymeric adhesive such as a polyurethane, and allowing the solvent to evaporate. In a further embodiment, when the nanoweb is electrospun directly onto a fabric, the solvent in which the nanoweb is spun is used to achieve solvent bonding.

The adhesive used to laminate the porous ePTFE membrane to the inner or outer fabric layers can also be one of a variety of fluorochemical dispersions or synthetic latexes, including aqueous anionic dispersions of butadiene acrylonitrile copolymers, copolymers based on acrylic esters, vinyl and vinylidene chloride polymers and copolymers produced by emulsion polymerization, styrene-butadiene copolymers, and terpolymers of butadiene, styrene, and vinyl pyridine.

In one embodiment of the invention a spacer scrim can be inserted in between the membrane and the outer fabric layer and is optionally bonded to either or both the membrane and the outer fabric layer. A "scrim" is a support layer and can be any planar structure with which the nanoweb can be bonded, adhered, or laminated. Advantageously, the scrim layers useful in the present invention are spunbond nonwoven layers, but can be made from carded webs of nonwoven fibers and the like.

EXAMPLES

For the examples described herein, fabric air flow permeability was measured using the Frazier measurement (ASTM D737). In this measurement, a pressure difference of 124.5 N/m$^2$ (0.5 inches of water column) is applied to a suitably clamped fabric sample and the resultant air flow rate is measured as Frazier permeability or more simply as "Frazier", and reported in units of m$^3$/m$^2$-min.

Fiber Diameter was determined as follows. Ten scanning electron microscope (SEM) images at 5,000× magnification were taken of each nanofiber layer sample. The diameter of eleven (11) clearly distinguishable nanofibers were measured from the photographs and recorded. Defects were not included (i.e., lumps of nanofibers, polymer drops, intersections of nanofibers). The average fiber diameter for each sample was calculated.

For the examples, a 24% solution of polyamide-6,6 in formic acid was spun by electroblowing as described in WO 03/080905 to form nanowebs. The number average fiber diameters were approximately 400 nm. Calendering of the nanowebs was carried out between nylon and steel rolls.

Table 1 shows four laminates of a nanoweb with a 25 micron thick ePTFE membrane. The nanoweb was optionally calendered before lamination.

TABLE 1

| Nanoweb Basis Weight (gsm) | Nanoweb Calendered? | Frazier (m$^3$/m$^2$-min) |
|---|---|---|
| 9.4 | No | 11.0 |
| 16.4 | Yes | 4.5 |
| 16.4 | No | 23.0 |
| 16.4 | Yes | 7.8 |

For bonding, a solvent-based adhesive (Brookwood Companies Incorporated, Wauregan, Conn.) was applied to the ePTFE via a gravure coating roll, the nanoweb was applied to the ePTFE/adhesive combination and then the composite was passed through a nip and dryer at a line speed of 21 feet per minute.

We claim:

1. A garment having an outer side and an inner side comprising a breathable laminate and an outer layer fabric, said breathable laminate comprising a microporous membrane situated in a face to face relationship with a nanoweb.

2. The garment of claim 1, wherein said membrane faces the outer layer fabric.

3. The garment of claim 1, wherein said membrane faces the inner side of the garment.

4. The garment of claim 1, further comprising an inner layer fabric.

5. The garment of claim 4, wherein the laminate is bonded to the inner layer fabric.

6. The garment of claim 1, wherein the membrane is selected from the group consisting of ePTFE and a microporous film.

7. The garment of claim 1, wherein the membrane is bonded to said nanoweb by a means selected from the group consisting of solvent bonding, adhesive bonding, thermal bonding, ultrasonic bonding and combinations thereof.

8. The garment of claim 2, wherein the laminate is bonded to the outer layer fabric by a means selected from the group consisting of stitching, adhesive bonding, thermal bonding, ultrasonic bonding and combinations thereof.

9. The garment of claim 5, wherein the laminate is bonded to the inner layer fabric by a means selected from the group consisting of stitching, adhesive bonding, thermal bonding, ultrasonic bonding and combinations thereof.

10. The garment of claim 1, wherein the outer layer fabric comprises woven materials selected from the group consisting of nylon, cotton, polyesters, polyacrylics, polypropylene, and combinations thereof.

11. The garment of claim 1, wherein the inner layer fabric comprises woven materials selected from the group consisting of nylon, cotton, polyesters, polyacrylics, polypropylene, and combinations thereof.

12. The garment of any of claims 1, 5, 8 or 9, wherein the laminate and the fabric layer are bonded to each other over a fraction of their surfaces.

13. The garment of claim 6, wherein the membrane is ePTFE which is bonded to the outer layer fabric with a polyurethane adhesive.

14. The garment of claim 1, wherein the nanoweb comprises nanofibers of a polymer selected from the group consisting of polyacetals, polyamides, polyesters, cellulose ethers, cellulose esters, polyalkylene sulfides, polyarylene oxides, polysulfones, modified polysulfone polymers and mixtures thereof.

15. The garment of claim 1, wherein the nanoweb comprises nanofibers of a polymer selected from the group consisting of poly(vinylchloride), polymethylmethacrylate, polystyrene, and copolymers thereof, poly(vinylidene fluoride), poly(vinylidene chloride), polyvinylalcohol in crosslinked and non-crosslinked forms.

16. The garment of claim 14, wherein the nanofiber layer comprises polyamide nanofibers selected from the group consisting of nylon-6, nylon-6,6, and nylon 6,6-6,10.

17. The garment of claim 1, wherein the nanoweb is calendered.

18. The garment of claim 1, wherein the nanoweb is either oleophobic or hydrophobic.

19. The garment of claim 1, further comprising a spacer scrim bonded between the microporous membrane and the outer fabric layer.

20. The garment of claim 1, wherein the nanoweb further comprises an antistatic agent.

* * * * *